(12) United States Patent
Lee et al.

(10) Patent No.: US 8,390,508 B1
(45) Date of Patent: Mar. 5, 2013

(54) GENERATING RADAR CROSS-SECTION SIGNATURES

(75) Inventors: Chul J. Lee, Lexington, MA (US); Richard A. Gilstrap, Burlington, MA (US)

(73) Assignee: Raytheon Company, Waltham, MA (US)

( * ) Notice: Subject to any disclaimer, the term of this patent is extended or adjusted under 35 U.S.C. 154(b) by 316 days.

(21) Appl. No.: 12/753,982

(22) Filed: Apr. 5, 2010

(51) Int. Cl.
*G01S 13/00* (2006.01)

(52) U.S. Cl. .............................. 342/90; 342/13; 342/175

(58) Field of Classification Search .................... 342/13, 342/175
See application file for complete search history.

(56) References Cited

U.S. PATENT DOCUMENTS

| | | | |
|---|---|---|---|
| 4,123,165 | A | 10/1978 | Brown et al. |
| 4,373,808 | A | 2/1983 | Pell et al. |
| 5,086,396 | A | 2/1992 | Waruszewski, Jr. |
| 5,096,281 | A | 3/1992 | Windebank et al. |
| H1181 | H | 5/1993 | Rihaczek |
| 5,227,801 | A * | 7/1993 | Pierce ........................... 342/192 |
| 5,305,430 | A | 4/1994 | Glassner |
| 5,317,689 | A | 5/1994 | Nack et al. |
| 5,355,442 | A | 10/1994 | Paglieroni et al. |
| 5,392,050 | A | 2/1995 | Guerci et al. |
| 5,583,975 | A | 12/1996 | Naka et al. |
| 5,588,032 | A | 12/1996 | Johnson et al. |
| 5,594,844 | A | 1/1997 | Sakai et al. |
| 5,616,031 | A | 4/1997 | Logg |
| 5,933,146 | A | 8/1999 | Wrigley |
| 5,953,722 | A | 9/1999 | Lampert et al. |
| 6,005,916 | A | 12/1999 | Johnson et al. |
| 6,031,542 | A | 2/2000 | Wittig |
| 6,212,132 | B1 | 4/2001 | Yamane et al. |
| 6,750,805 | B1 | 6/2004 | Cameron |
| 6,750,859 | B2 | 6/2004 | Sowizral et al. |
| 6,924,763 | B2 | 8/2005 | Poullin |
| 6,941,303 | B2 | 9/2005 | Perrizo |
| 7,123,548 | B1 | 10/2006 | Uzes |
| 7,289,118 | B2 | 10/2007 | Schmittler et al. |
| 7,348,975 | B2 | 3/2008 | Reshetov et al. |
| 7,369,081 | B1 * | 5/2008 | Ganz et al. ........................ 342/12 |
| 7,382,397 | B2 | 6/2008 | Mottur |
| 7,535,408 | B2 | 5/2009 | Kuhn |

(Continued)

FOREIGN PATENT DOCUMENTS

| | | |
|---|---|---|
| WO | WO 2009/021100 | 2/2009 |
| WO | WO 2009/038894 | 3/2009 |

OTHER PUBLICATIONS

U.S. Appl. No. 12/212,783, filed Sep. 18, 2008, 76 pages.

(Continued)

*Primary Examiner* — Timothy A Brainard
(74) *Attorney, Agent, or Firm* — Daly, Crowley, Mofford & Durkee, LLP

(57) ABSTRACT

In one aspect, a method to generate radar cross section (RCS) signatures, includes determining a spectrum of an object and using the spectrum of the object to generate RCS signatures of a plurality of objects. In another aspect, an apparatus to generate radar cross section (RCS) signatures includes circuitry to determine a spectrum of an object; and use the spectrum of the object to generate RCS signatures of a plurality of objects. In a further aspect, an article includes a machine-readable medium that stores executable instructions to generate radar cross section signatures (RCS). The executable instructions cause a machine to determine a spectrum of an object and use the spectrum of the object to generate RCS signatures of a plurality of objects.

20 Claims, 9 Drawing Sheets

U.S. PATENT DOCUMENTS

| | | | |
|---|---|---|---|
| 7,567,205 B1 | 7/2009 | Lee | |
| 7,592,947 B1 | 9/2009 | Lee | |
| 7,602,332 B1 | 10/2009 | Lee | |
| 7,616,151 B1 | 11/2009 | Lee | |
| 7,646,332 B2 | 1/2010 | Lee | |
| 7,652,620 B2 | 1/2010 | Lee | |
| 7,750,842 B2 | 7/2010 | Lee | |
| 2002/0060784 A1 | 5/2002 | Pack et al. | |
| 2002/0075260 A1 | 6/2002 | Brokenshire et al. | |
| 2002/0087858 A1 | 7/2002 | Oliver et al. | |
| 2003/0011519 A1 | 1/2003 | Breglia et al. | |
| 2003/0022395 A1 | 1/2003 | Olds | |
| 2003/0093430 A1 | 5/2003 | Mottur | |
| 2003/0112234 A1 | 6/2003 | Brown et al. | |
| 2005/0138073 A1 | 6/2005 | Zhou et al. | |
| 2006/0059494 A1 | 3/2006 | Wexler et al. | |
| 2006/0160495 A1 | 7/2006 | Strong | |
| 2006/0210169 A1 | 9/2006 | Colestock et al. | |
| 2007/0061619 A1 | 3/2007 | Nemirovsky et al. | |
| 2007/0165042 A1 | 7/2007 | Yagi | |
| 2008/0052334 A1 | 2/2008 | Yamazoe | |
| 2008/0132174 A1 | 6/2008 | Corral et al. | |
| 2009/0040096 A1 | 2/2009 | Lee et al. | |
| 2009/0040098 A1 | 2/2009 | Lee et al. | |

OTHER PUBLICATIONS

Notice of Allowance and Fee(s) Due dated Jul. 14, 2010, U.S. Appl. No. 12/212,783, filed Sep. 18, 2008, 8 pages.
Notification of Transmittal of the International Search Report and the Written Opinion of the International Searching Authority, or the Declaration, PCT/US2008/072434 dated Jun. 2, 2009, 4 pages.
The Written Opinion of the International Searching Authority, PCT/US2008/072434 dated Jun. 2, 2009, 9 pages.
Walker et al.: "Parallel Computation of Time-Domain Integral Equation Analyses of Electromagnetic Scattering and RCS", IEEE Transactions on Antennas and Propagation, IEEE Service Center, Piscataway, NJ, US, vol. 45, No. 4, Apr. 1, 1997, XP011002960, ISSN: 0018-926X.
Ngoly et al.: "Parallel Post-Processing Techniques for Fast Radar Cross-Section Computation", 2006 12th Biennial IEEE Conference on Electromagnetic Field Computation, Apr. 30, 2006, Piscataway, NJ, USA, IEEE, pp. 377-377, XP010917223, ISBN: 978-1-4244-0320-2.
Ling et al.: "Shooting and bouncing rays: calculating the RCS of an arbitrarily shaped cavity", IEEE Transactions on Antennas and Propagation USA, vol. 37, No. 2, Feb. 1989, pp. 194-205, XP002528225, ISSN: 0018-926X.
Savides et al.: "Radar simulation using the shooting and bouncing ray technique" CCECE 2003, Canadian Conference on Electrical and Computer Engineering, Montreal, Canada, May 4-7, 2003, New York, NY, IEEE, US, vol. 1, May 4, 2003, pp. 307-310, XP010653888, ISBN: 978-0/7803-7781-3, abstract.
Hu et al.: "RCS computation of jet engine with complex termination based on multiplaten Z-buffer algorithm", Microwave Conference, 1999 Asia Pacific Singapore, Nov. 30-Dec. 3, 1999, Piscataway, NJ, USA, IEEE, US, Nov. 30, 1999, pp. 781-784, XP010374299, ISBN: 978-0-7803-5761-7, abstract.
Notification Concerning Transmittal of International Preliminary Report on Patentability (Chapter 1 of the Patent Cooperation Treaty), PCT/US2008/072434 dated Feb. 18, 2010, 11 pages.
Notification of Transmittal of the International Search Report and the Written Opinion of the International Searching Authority, or the Declaration, PCT/US2008/072433 dated Feb. 24, 2009, 5 pages.
The Written Opinion of the International Searching Authority,PCT/US2008/072433 dated Feb. 24, 2009, 8 pages.
Lozano et al.: "Improvements in Ray-Tracing Acceleration Techniques to Compute Diffraction Effect and Doubles and Triples Effects in the RCS Prediction of Complex Targets" Antennas and Propagation Society Symposium, 2005. IEEE Washington, DC, Jul. 3-8, 2005, Piscataway, NJ: IEEE, US, vol. 3A, Jul. 3, 2005, pp. 93-96, XP010859931, ISBN: 978-0-7803-8883-3.
Schmitz et al.:"Zpatch. A high frequency bistatic signature prediction code" Radar conference, 1997, IEEE National Syracuse, NY, USA, May 13-15, 1997, New York, NY, USA, IEEE, US, May 13, 1997, pp. 232-236, XP010224771, ISBN: 978-0-7803-3731-2.
Yu et al.: "Radar cross section computation and visualization by shooting-and-bouncing ray (SBR) technique" Proceedings of the Antennas and Propagation Society International Symposium (APSIS). Chicago, Jul. 20-24, 1992; [Proceedings of the Antennas and Propagation Society International Symposium (APSIS)], New York, IEEE, US, vol. -, Jul. 18, 1992, pp. 1323-1326, XP010065787, ISBN: 978-0-7803-0730-8.
Notification Concerning Transmittal of Intrnational Preliminary Report on Patentability (Chapter 1 of the Patent Cooperation Treaty), PCT/US2008/072433 dated Feb. 18, 2010, 11 pages.
Ozturk: "Implementation of Physical Theory of Diffraction for Radar Cross Section Calculations", The Institute of Engineering and Sciences of Bilkent University, in Partial Fulfillment of the Requirements for the Degree of Master of Science, Jul. 2002, 72 pages.
Shore et al.: "Application of incremental length diffraction coefficients to calculate the pattern effects of the rim and surface cracks of a reflector antenna", Antennas and Propagation Society International Symposium, 1993, AP-S Digest, pp. 1350-1353.
Ozdemir et al.: "Fast ASAR Imag Formation Using the Shooting and Bouncing Ray Technique", IEEE Antennas and Propagation Society International Symposium, vol. 4, pp. 2605-2608, Jul. 13-18, 1997.
Hansen, "Corner Diffraction Coefficients for the Quarter Plate", IEEE transactions on Antennas Propagation, vol. 39, No. 7, pp. 976-984, Jul. 1991.
Shore et al.: "Application of Incremental Length Diffraction Coefficients to Calculate the Pattern Effects of the Rim and Surface Cracks of a Reflector Antenna", IEEE Antennas and Propagation Society International Symposium, 1993.
Havran: "Heuristic Ray Shooting Algorithms", PhD thesis, Czech Technical University in Prague, Nov. 2000, 220 pages.
Antenna Handbook, vol. I Fundamentals and Mathematical Techniques; P.H. Pathak, Ohio State University ElectroScience Laboratory; Edited by Y.T. Lo and S.W. Lee; Chapter 4, pp. 4-1-4-110.
Ufimtsev, P. Ya., "Diffraction of Plane Electromagnetic Waves by a Thin Cylindrical Conductor", Radio Eng. Electron Phys., vol. 7, pp. 241-249, 1962.
Pathak et al., "Model, Ray, and Beam Techniques for Analyzing the EM Scattering by Open-Ended Waveguide Cavities", IEEE Transaction on Antennas and Propagation, vol. 37, No. 5, May 1989, pp. 635-647.
Pathak et al., "An Efficient Hybrid FE-BI-TW-Collective Ray Formulation for Analysis of Large Conformal Arrays", 2008 Union Radio Scientifique Internationale—(URSI) General Assembly, Aug. 7-16, 2008, 4 pages.
Oguzer et al., "On the Elimination of Infinities in the PO Component of Equivalent Edge Currents", Wave Motion, vol. 18, pp. 1-10, 1993.
Prabhakar H. Pathak, "High-Frequency Techniques for Antenna Analysis", Proceedings of the IEEE, vol. 80, No. 1, Jan. 1992, pp. 44-65.
Book, Edited by Andrew S. Glassner, "An Introduction to Ray Tracing", U.S. Edition Published by Academic Press, 1989, 329 pages.
Steve Kosanovich, "Fundamentals of Xpatch", Training Class Manual, SAIC DEMACO, Apr. 28, 2008.
Real-time radar cross section of complex targets by physical optics graphical processing; Rius, J.M.; Ferrando, M.; Antennas and Propagation Society International Symposium, 1990, AP-S. Merging Technologies for the 90's'. Digest. May 7-11, 1990 pp. 1280-1283 vol. 3.
Xpatch 4: the next generation in high frequency electromagnetic modeling and simulation software; Andersh, D.; Moore, J.; Kosanovich, S.; Kapp, D.; Bhalla, R.; Kipp, R.; Courtney, T.: Nolan, A.; German, F.; Cook, J.; Hughes, J.; Radar Conference, 2000. The Record of the IEEE 2000 International.
3D scattering center extraction from Xpatch, Bhalla, R. Hao Ling, Dept. of Electr. & Comput. Eng., Texas Univ., Austin, TX; Antennas and Propagation Society International Symposium, 1995. AP-S. Digest, Jun. 18-23, 1995, vol. 4, on pp. 1906-1909 vol. 4, Jun. 18-23, 1995.
Bhalla et al.: "Three-dimensional scattering center extraction using the shooting and bouncing ray technique", Antennas and Propagation, IEEE Transactions, vol. 44, Issue 11, Nov. 1996, pp. 1445-1453.

Bhalla et al.: "Near-field signature prediction using far-field scattering centers extracted from the shooting and bouncing ray technique"; Antennas and Propagation, IEEE Transactions, vol. 48, Issue 2, Feb. 2000, pp. 337-338.
U.S. Appl. No. 12/212,787, filed Sep. 18, 2008, 291 pages.
U.S. Appl. No. 12/138,711, filed Jun. 13, 2008, 313 pages.
U.S. Appl. No. 12/138,814, filed Jun. 13, 2008, 216 pages.
U.S. Appl. No. 12/212,779, filed Sep. 18, 2008, 398 pages.
U.S. Appl. No. 12/212,783, filed Sep. 18, 2008, 339 pages.
U.S. Appl. No. 12/212,786, filed Sep. 18, 2008, 232 pages.
U.S. Appl. No. 11/889,197, filed Aug. 9, 2007, 254 pages.
U.S. Appl. No. 11/889,198, filed Aug. 9, 2007, 219 pages.

* cited by examiner

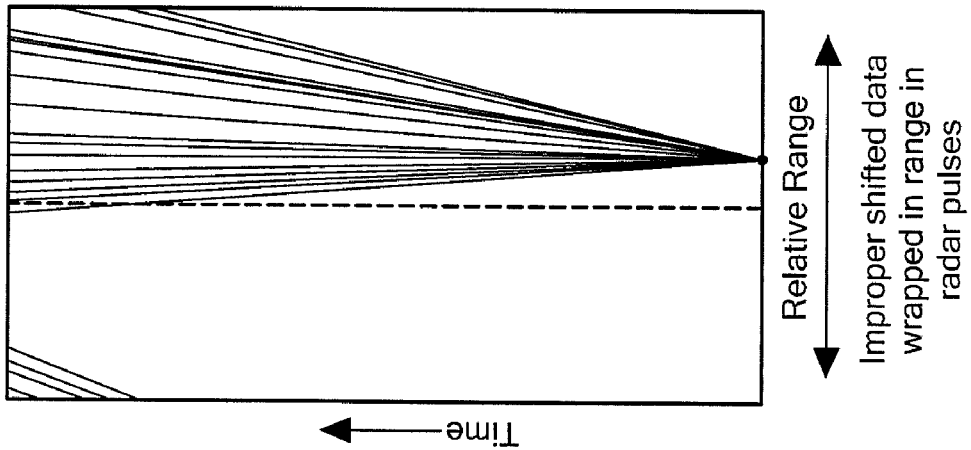
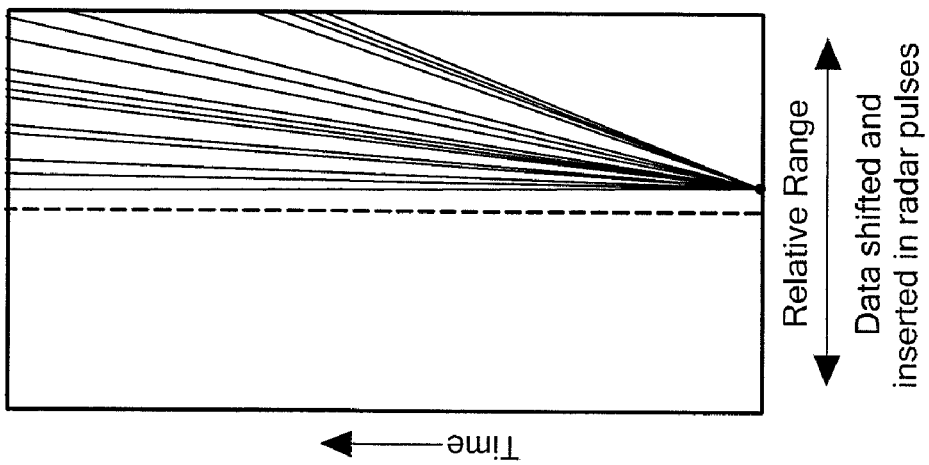
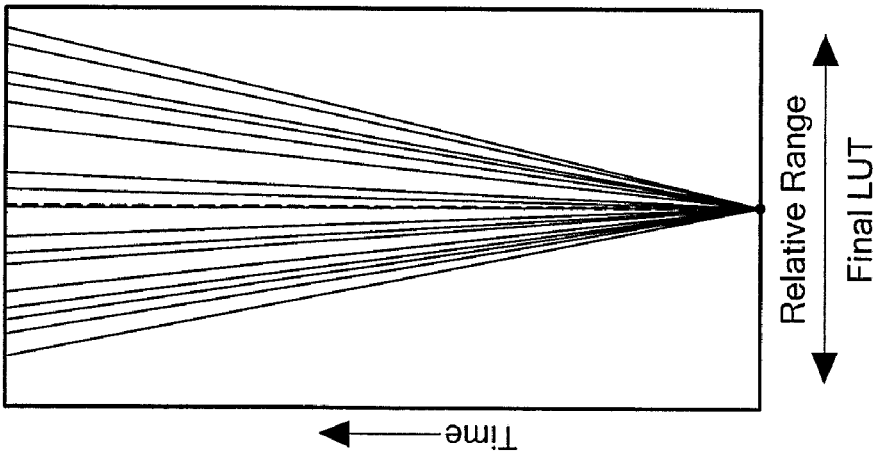

GENERATING RADAR CROSS-SECTION SIGNATURES

GOVERNMENT SPONSORED RESEARCH

This invention was made with Government support under Contract Number HQ0006-03-C-0047 awarded by the Missile Defense Agency (MDA). The United States Government has certain rights in the invention.

BACKGROUND

A radar system emits radio waves that are reflected by an object in a form of a reflected signal that is detected by the radar system. Based on the round trip time duration and the angle of the reflected signal, the location of the object may be determined. In training scenarios, instead of using actual objects, it is more practical and cost effective to use simulated radar objects. The simulated radar objects may be generated using radar signature modeling tools that emulate the radar object.

Chaff is used by aircraft to evade hostile forces or by ballistic missiles to mask the objects in the missile complex. For example, the chaff is released by an aircraft and used to create radar objects to draw enemy fire away from the aircraft. Generally, chaff includes metallic structures that are easily detected by radar. To simulate chaff in the past, extensive lookup tables were used to form a single instance of radar data of simulated chaff. These prior art approaches are time consuming, even on modern computers, so that chaff cannot be generated in real-time for radar simulation and Monte Carlo testing.

Referring to FIG. 1A, a missile 12 includes a chaff dispenser 14. The chaff dispenser releases (dispenses) chaff packages 16a, 16b, 16c (called herein "pucks") into the air. Generally, the pucks are dispensed at different times. The pucks 16a-16c disperse a cloud of chaff 18. A radar 20 detects the chaff from the pucks 16a-16c and the missile 12 so that it appears to a user there are more missiles so that more enemy munitions are directed towards the chaff than the missile.

SUMMARY

In one aspect, a method to generate radar cross section (RCS) signatures, includes determining a spectrum of an object and using the spectrum of the object to generate RCS signatures of a plurality of objects. In another aspect, an apparatus to generate radar cross section (RCS) signatures includes circuitry to determine a spectrum of an object; and use the spectrum of the object to generate RCS signatures of a plurality of objects. In a further aspect, an article includes a machine-readable medium that stores executable instructions to generate radar cross section signatures (RCS). The executable instructions cause a machine to determine a spectrum of an object and use the spectrum of the object to generate RCS signatures of a plurality of objects.

One or more of the aspects above may include one or more of the following features. Using the spectrum of the object to generate RCS signatures of a plurality of objects may include using a lookup table representing the spectrum of the object. Determining a spectrum of an object may include determining a frequency spectrum of the object. Determining a spectrum of an object may include determining a spectrum of an object that includes chaff. Using the spectrum of the object to generate RCS signatures of a plurality of objects may include using the spectrum of the object that includes chaff to generate RCS signatures of a plurality of objects that includes chaff. Using the spectrum of the object that includes chaff to generate RCS signatures of a plurality of objects that includes chaff may include interpolating time, selecting frequencies to match a center frequency and bandwidth of a radar pulse, resampling to frequency sampling of radar to match a range bin size and shifting and applying trajectory phase and scaling.

DESCRIPTION OF THE DRAWINGS

FIGS. 6A to 6C are a set of drawings of sequences of radar pulses in the time domain.

DETAILED DESCRIPTION

Figure 1A:
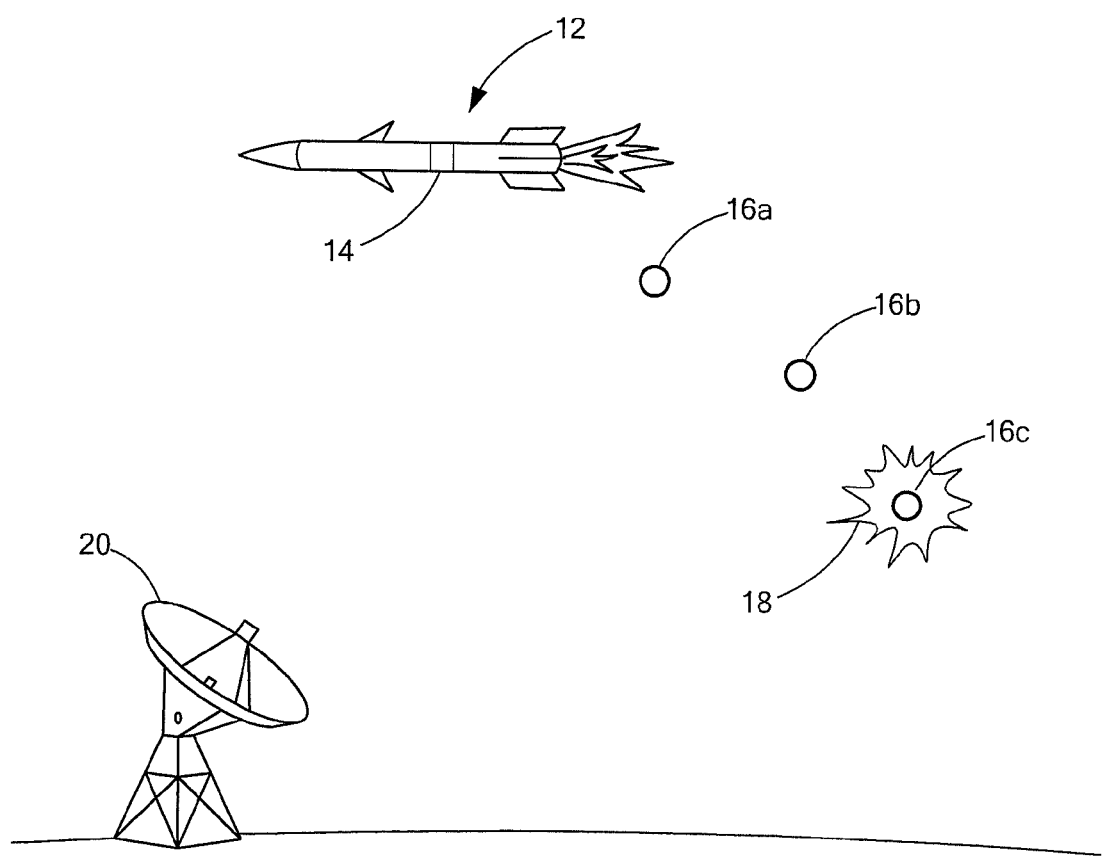
FIG. 1A is a view of a missile releasing chaff.

Prior art radar cross section (RCS) signature prediction models are used to generate radar chaff signatures for each scenario and stored in lookup tables. A single database for multiple scenarios is not practical to generate all potential scenarios and waveforms for chaff. The alternative approach to a massive database generation for chaff is to predict RCS signature in real-time using a much smaller lookup table. The methods described herein provide a technique to generate chaff RCS signatures, for example, in real-time, while retaining a high-fidelity model.

The Acceleration Method, described herein, is a technique to quickly generate RCS signatures for the multiple puck and dispenser activities. Emulating chaff signatures for the multiple puck/dispenser activities has been achieved by combining corresponding puck signatures, extracted from single puck's signature database, after linear phase shifts according to scenario trajectories and radar beam scheduling.

While the particular examples described herein focus on chaff, the techniques described herein may be applied to other types of objects like reentry vehicles and rocket bodies. The focus is on chaff in this description because of the large numbers of pieces of chaff that can be deployed (e.g., thousands or tens of thousands deployed) whereas for other object types (e.g., reentry vehicles, rocket bodies and so forth) the numbers are typically on the order of ones to tens. To consider implementation for other object types a Final Look-up Table (LUT) of chaff is determined and a chaff cloud trajectory is generated. The Final LUT may be substituted with a target LUT of target scattering data as a function of aspect angle and chaff puck trajectory information substituted with target Center of Gravity (CG) trajectory and rotational orientation information.

Before describing the Final LUT the theory and assumptions are first described.

In signal processing one typically observes a sinusoidal signal, $z(t) = A\exp(i2\pi ft + \Phi)$, $(i=\sqrt{-1})$, that depends on time as the independent variable and has a fixed constant frequency, f is used. Fourier transformation provides a frequency spectrum with a peak at f. When working with Linear Frequency Modulation (LFM) waveforms in radar the convention is to use the intermediate radar pulse, prior to Fourier Transformation, as a frequency domain signal. In this convention the radar signal is represented as $s(f)=A\exp(i2\pi\tau f+\Phi)$, a sinusoid that depends on frequency as the independent variable and $\tau$, a fixed constant for a pulse, that represents the target offset from the pulse's time reference point. Typically, the time reference is the beginning or middle of the pulse. A Fourier transform performed on this signal will have a peak at $\tau$ in the resulting spectrum that represents the target's time offset from the pulse's reference time. The sign convention of the signal varies from radar to radar so that one will see the use of a Fourier transform or an inverse Fourier transform depending on the radar's convention. This final Fourier transform to complete 'Pulse Compression' can be a multi-step process with windowing and shifts such that any implementation of this algorithm has to match the specific radar's final Fourier transform process and sign convention.

As used herein, reference is made to 'wrapping' or 'ambiguous Doppler' after the Fourier transformation. This is a numerical phenomenon that occurs when working with discreet data series and the discreet Fourier transforms. To see the origin of this consider the signal $\exp(i\omega n)$. If $\omega = \Delta\omega + 2\pi m$ for m integer, then the signal looks like $\exp(i\Delta\omega n + i2\pi mn) = \exp(i\Delta\omega n)\exp(i2\pi mn) = \exp(i\Delta\omega n) 1 = \exp(i\Delta\omega n)$ because $\exp(i2\pi mn) = 1$ for all m and n.

As described herein a deramped LFM Radar Pulse Model is used. An LFM electromagnetic pulse has a frequency of oscillation that varies linearly with time ($f = Bt/T + f_c$) so that the signal form is $\exp(i2\pi(Bt^2/T + f_c t + \phi_0))$. This electromagnetic pulse reflects off the target and returns to the radar. On arrival at the radar the received pulse is mixed with the conjugate of a duplicate of the transmitted pulse that is triggered at the expected time of arrival of the reflected pulse and has used a stable oscillator as carrier frequency reference ($f_c$). The resulting deramped signal then has the form $\exp(i2\pi(B\tau_{roff}t/T + f_c\tau_{rt}))$ ignoring Doppler effects. In practice the Doppler effect on the frequency slope is pre-compensated on transmit or receive and the residual effects are negligible. The Doppler shift component due to the carrier frequency gives rise to the Range Doppler Coupling (RDC) effect and is treated as a time/range offset in later processing and may be pre-compensated. $\tau_{rt}$ is the round trip time for the pulse from the radar to the target and back for a coherent radar. $\tau_{roff}$ is a time offset between the time when the reflected pulse arrived at the radar and the reference pulse was triggered. The time offset, $\tau_{roff}$ would be zero if the radar could determine exactly where the target was as a function time and choose to trigger the reference pulse appropriately. For fixed sampling rate of the deramped signal $t/T = n/(N-1)$, N=# of samples, and the deramped signal pulse for a scatterer that has not been trajectory phase corrected is:

$$\exp(i2\pi(B\tau_{roff}n/(N-1)+f_c\tau_{rt})), n=\{-N/2 \text{ to } N/2\},$$

which is considered to be the LFM frequency domain radar signal and is the final form of the simulated pulse that is added into the radar data.

To enable coherent processing of a sequence of radar pulses it is advantageous to apply a phase correction to each pulse. $\tau_{rt} = 2R(t)/c$, $R(t)$ is the target center of gravity slant range from the radar as a function of time, c is the speed of light in vacuum. In actual radar data there are tropospheric delays due to the index of refraction in the earths' atmosphere. There are other radar frequency dependent effects also. The actual term is $(2R(t)+\delta R)/c$ for Phase Comparison Monopulse with $\delta R$ depending on which quadrant the antenna phase data is processed from and where c is the speed of light. The product $f_c\tau_{rt} = f_c 2R(t)/c = 2R(t)/\lambda_c$ typically changes by a large amount from one pulse to another given target range rates and is input to a sinusoidal function. A phase correction is applied for this trajectory motion. Typically, an estimate of target (e.g., chaff puck) center of gravity (CG) location as a function of time pulse to pulse phase variation is reduced to scatterer motion about the CG by this phase correction. Assuming RDC will be applied correctly as an additive effect later and assuming the radar reference pulse was triggered for the target CG (or Chaff puck CG), the phase corrected frequency domain LFM signal to generate the Final LUT is of the form:

$$S_n \exp(i2\pi(B\tau_{roff}n/(N-1)+f_c\tau_{roff})),$$

where the phase term depends on $\tau_{roff}$, the same as the frequency varying time offset. This time offset is the time offset of a scatterer/chaff piece from the CG of the target/chaff puck, the round trip time of an EM wave from the scatterer to the CG along the direction defined by the radar line of sight. It has a correspondence to the scatterer range offset from the pulse's reference range of $\tau_{roff} = 2\Delta R_{roff}/c$. The actual term is $\tau_{roff} = (2\Delta R_{roff} + \delta R)/c$ for Phase Comparison Monopulse with $\delta R$ depending on which quadrant of antenna phase data is processed from.

Figure 1B:
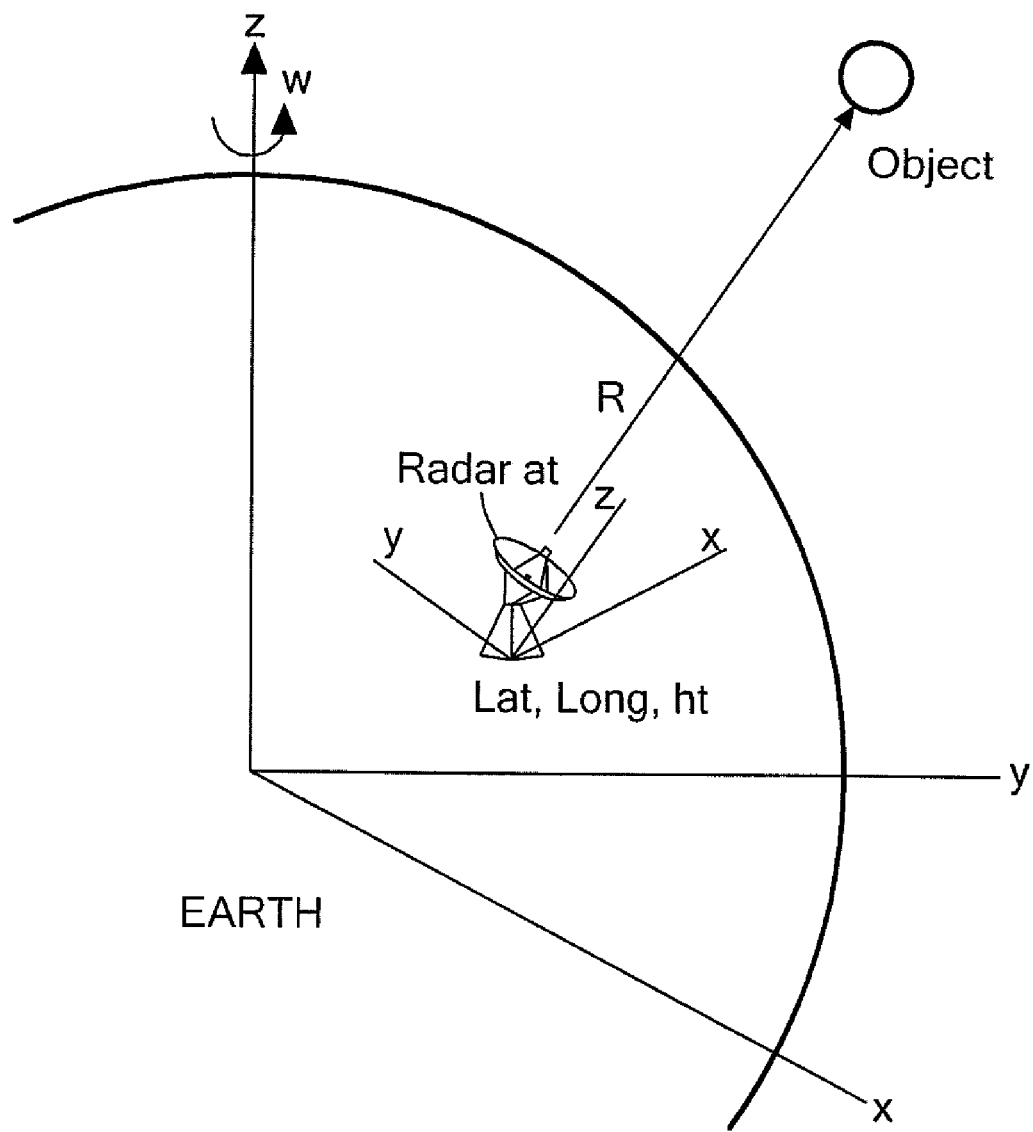
FIG. 1B is a drawing of coordinate systems of importance for this process.

FIG. 1B shows a radar located on the surface of the earth. There are many variations of coordinate systems one could employ for this problem. Of note are Cartesian coordinate systems centered in the earth, centered at the radar antenna with z axis vertical and centered at the radar antenna center with z axis perpendicular to a plane tangent to the antenna.

The other two coordinate systems of note are common radar coordinate measurement frames. RAE, Range, Azimuth, and Elevation, centered at the radar antenna, Range is the distance from the antenna center to the object, Azimuth is the angle of the object relative to the radar measured clockwise from north and elevation is the angle of the object relative to the radar measured up from the horizontal. RUV, Range, U, V is a phased array radar coordinate system, Range is the distance from the antenna center to the object, U is the direction cosine of the line of sight of the object from the radar with the transverse direction of the antenna. (x-axis of FIG. 1C) V is the direction cosine of the line of sight of the object from the radar with the vertical direction of the antenna. (y-axis of FIG. 1C).

Figure 1C:
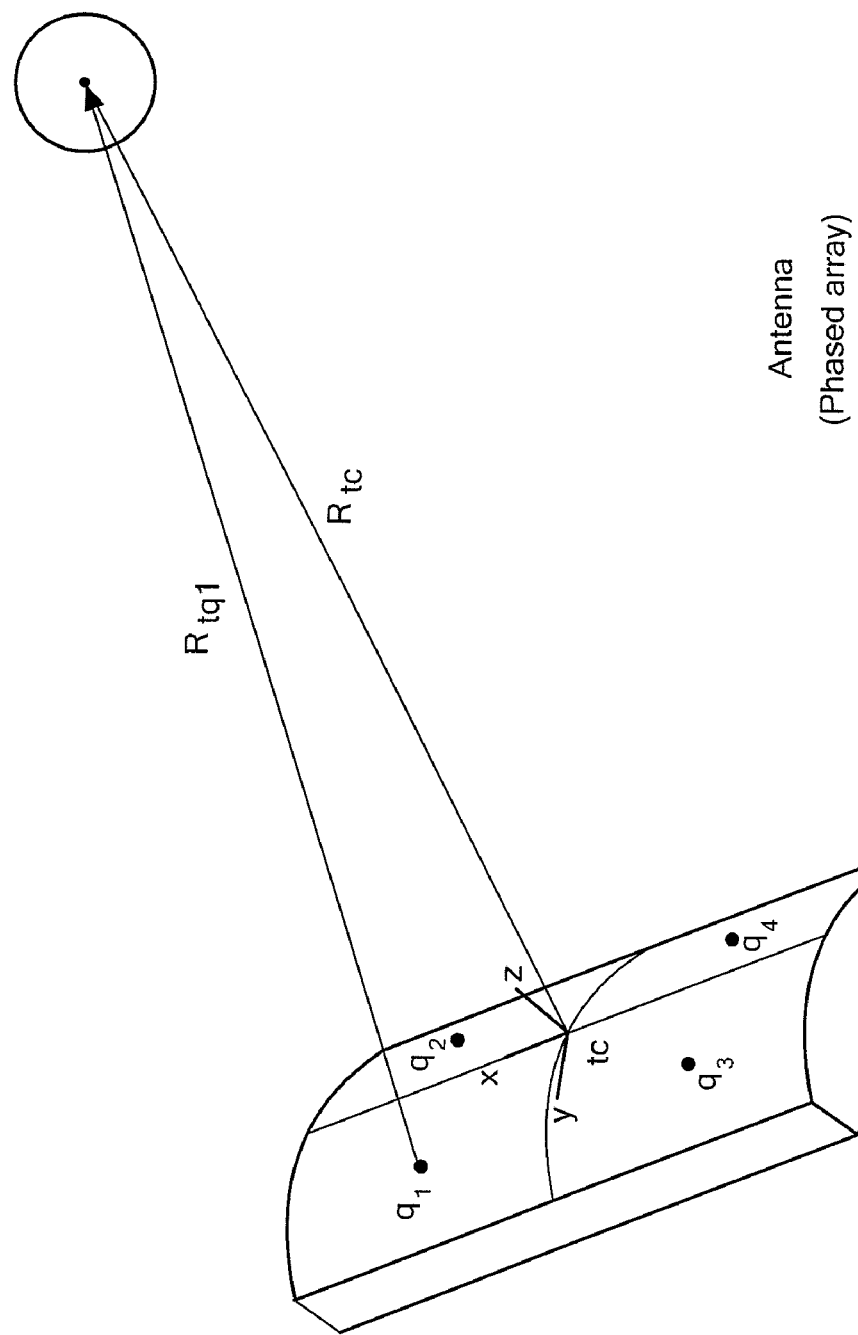
FIG. 1C is a drawing of a radar antenna showing four quadrants and the different line of sight distances from them used in phase comparison monopulse.

Referring to FIG. 1C, the model described herein uses four phase centers, $q_1, q_2, q_3, q_4$. These phase centers can be offset from the physical antenna by appropriate relative phasing of transmit and receive processing. In particular, all four quadrants of the radar antenna transmit energy. The resulting signal arrives at the target as if it was transmitted as a point source located at the antenna center, $t_c$. The radar energy is reflected off the target and returns to the radar antenna. Each of the four quadrants operates as its own receiver channel that is centered in the quadrant. The received signal at a quadrant then has a round trip range dependence that includes the range from the antenna center to the target, $R_{tc}$, plus the range from the particular quadrant (quadrant $s=\{1, 2, 3, 4\}$) to the target, $R_{tqs} = R_{tc} + \delta R_{tqs}$ ($\delta R_{tqs} \sim \pm d_{qs}\delta\theta_{tq}$ with $\delta\theta_{tq}$ the target angular offset from the beam center and $d_{qs}$ the quadrant phase center offset from the antenna center in the horizontal or vertical), so for quadrant s the received signal looks like $$S_{qs} = \exp(i2\pi B/c(2\Delta R_{tc}+\delta R_{tqs})n/(N-1)+i2\pi(2R_{tc}+\delta R_{tqs})/\lambda)$$

The frequency dependent term, $B/c(2\Delta R_{tc}+\delta R_{tqs})n/(N-1)$, is not substantially affected since $\delta R_{tqs}$ is less than 1/10 of the range resolution. In the time domain this quadrant's return is then, $s_{qs}=A\exp(i2\pi(2R_{tc}+\delta R_{tqs})/\lambda))$. The phase term is altered by $2\pi\delta R_{tqs}/\lambda$ and is the effect of interest in capturing a measurement of the angle offset of the target from the beam center. One determines the sums and differences:

$$\Delta_\alpha = S_{q1}+S_{q2}-S_{q3}-S_{q4},$$

$$\Delta_\beta = S_{q1}+S_{q3}-S_{q1}-S_{q4} \text{ and}$$

$$\Sigma = S_{q1}+S_{q2}+S_{q3}+S_{q4}.$$

After a Fourier transformation of these signals to the time domain, the ratios $\Delta_\alpha/\Sigma$ and $\Delta_\beta/\Sigma$ then give the appropriate monopulse ratios for computing the horizontal ($\alpha$) and vertical ($\beta$) angle offsets of the target from the beam center. One can see this easily when the difference between the received time domain signals from two phase centers (e.g., 1 and 3) is divided by the sum of the two to form the monopulse input for the target range bin, the resulting form is, $i \tan(2\pi\delta R_{r\alpha}/\lambda) = i \tan(2\pi d_\alpha/\lambda \delta\theta_t)$ ($i=\sqrt{-1}$) with $d_\alpha$ the distance from the array center to the quadrant's phase center. The symbol q which denoted the quadrant has been changed to $\alpha$ to denote the alpha channel which corresponds to the sums and differences of the different quadrants in the horizontal, $\beta$ would correspond to the sums and differences of the different quadrants in the vertical.

As used herein radar signature data is a radar pulse prior to any detection processing. I and Q data is a radar pulse prior to any detection processing, where I is the real component and Q is the imaginary component. B represents radar pulse bandwidth, and is the span of wave frequencies in the electromagnetic energy processed in the receive radar pulse. $f_c$ represents a center frequency of the transmitted radar pulse. PW is a pulse width of the radar pulse (duration in time). Monopulse is a term describing the collection and processing of data and the data itself to support the measurement of angular offsets of objects in radar data. RDC is Range Doppler Coupling effect in LFM radar data and is the apparent shift in range (time) of an object due to Doppler shift of radar carrier frequency given by object range rate multiplied by $PW*f_c/B$. R, range, slant range.

Referring back to FIG. 1C, U is the direction cosine of the line of sight of the object from the radar with the transverse direction of the antenna. (x axis.). V is the direction cosine of the line of sight of the object from the radar with the vertical direction of the antenna. (y axis.). $\Delta r_{bin\ size} = c/(2B)(N_s-1)/(N_{fft}-1)$. Distance spanned between one range bin and another in the time domain radar pulse. (B is pulse bandwidth, c is speed of light, $N_s$ is the number of samples of the pulse in the frequency domain and $N_{fft}$ is the size of the Fourier Transform applied to the pulse). $\Sigma$=Sum of m phase centers channel data, $\Delta_\alpha$=Appropriate sum and difference of m phase centers' data is alpha difference channel pulse and $\Delta_\beta$=Appropriate sum and difference of m phase centers' data is beta difference channel pulse As described herein a two part approach is used to generate chaff: an Offline Portion and a Real-Time Portion. In the Offline Portion part, the Final LUT table is generated that includes the radar LFM response of a particular instance of a chaff cloud (e.g., a single chaff puck or a dispenser of multiple pucks) centered in the radar beam and radar range window. This is done for the full operational bandwidth of the radar, for a sequence of radar pulses at a fixed PRF (Pulse Repetition Frequency) from the chaff deployment time until it is expected that, for the scenarios of use, the chaff cloud will exit the FOV (Field of View) or move beyond the detectable range for the radar. The Final LUT generation process accesses a chaff dipole electromagnetic Scattering LUT. This Scattering LUT would typically be generated with Method of Moments electromagnetic scattering code and stores the scattering amplitude and phase for an individual chaff piece as a function of frequency and angle of incidence of the radar beam.

In the Offline Portion, radar RCS (Radar Cross Section) prediction code to generate a LUT (called herein a "Scattering LUT") of the amplitude and phase of the monostatic reflected electromagnetic energy from the radar for a single piece of chaff as a function of frequency and aspect angle is used generate the Final LUT. The aspect angle is the angle between the incident radar electromagnetic wave and the vector normal to the long axis (axis of symmetry assuming a wire dipole, this can be easily generalized to asymmetric objects) of the chaff piece. The amplitude and phase are generated for a sampling of frequencies between the minimum and maximum operating frequency of the radar, for a sampling of chaff object orientations (aspect angles) relative to the radar line of sight. The Scattering LUT can be reused for multiple chaff puck types and scenarios. A different Scattering LUT is required for each chaff type (Different chaff piece types) to be simulated.

In the second part, referred to herein as the "Real Time Portion", the Final LUT (A single instance of radar data of a chaff puck, one could generate several Final LUTs and mix and match at random to introduce additional statistical variation of the chaff) is used in a real time or near real time radar simulation as the reference data to insert the chaff data into radar pulses as the pulses are placed by the real time tracking and scheduling algorithms of the radar software. This is accomplished by appropriate interpolation, time shifting and application of trajectory phase to be described in more detail later. This approach retains a very high fidelity representation of chaff data and reduces the real time computations from being done thousands or tens of thousands of times to a few times per radar pulse and allows for Monte Carlo runs to be performed with different target trajectories and statistical variation of the chaff cloud trajectories using the radar real time tracking, discrimination and pulse scheduling algorithms.

In the Real Time portion, the Final LUT is used to generate multiple chaff pucks. In particular, using the set (pulses) of deramped LFM spectra of a single chaff puck (The Final LUT), radar pulses with chaff from multiple chaff pucks along various trajectory offsets from the baseline complex trajectory can be produced with limited computation load. This process can be applied to multiple macro-objects of the same type (see processing block 230 of FIG. 2). For example, if the macro-object is a chaff dispenser that holds chaff pucks, then the RCS signatures of multiple chaff dispensers and their chaff may be determined as a way to reduce computational load further.

This is accomplished by flying (Numerical integration of the pucks' position and velocity using a gravity model) the chaff puck trajectories to the time of the radar pulse. The appropriate pulses from the Final LUT are selected based on time from the beginning of dispensing of chaff from each puck. The difference between the radar pulse time and the puck dispensing start time is used to select pulses from just before and just after the radar pulse time. Then the appropriate frequency samples from these selected Final LUT pulses are selected for the current pulse's center frequency and bandwidth. This data is used to interpolate to the time of the radar pulse under construction and interpolated in frequency to ensure a match in radar range bin size with the radar pulse's range bin size. There is interplay between the radar pulse's pulse width (The time duration of a pulse) and the Analog to Digital converter rate that produces the frequency sampling that is the equivalent of what is in the Final LUT. The radar will generate a specific number of frequency samples for a given pulse width and then zero pad (Zero padding is the appending of zeros to a data vector until the data vector has length that is a power of two in preparation of applying a FFT.) the data up to a power of two in preparation for application of a Fast Fourier Transform (FFT) to complete pulse compression. This combination of bandwidth, number of frequency samples for the pulse width and FFT size determine the range bin size in the Final compressed pulse. The frequency data is resampled from the Final LUT such that after zero padding and FFT the range bin size is the same as the radar pulse being added to the simulated chaff. The Final LUT may have substantially fewer or substantially greater number of frequency samples than the radar pulse. (e.g., equivalent to coming from a longer or shorter pulse width pulse, but as long as B (bandwidth) and range bin size are matched the final data combination is valid). In particular, the single puck radar signatures will in general be sampled at a different frequency sampling interval than the radar pulse and have a different number of frequency samples within the pulse's bandwidth. This, combined with the use of the FFT which is restricted to a power of two for the number of points, means that the range bin size of the single puck signature will in general not match the range bin size of the radar pulse. Given a radar pulse of bandwidth B with a number of samples, $N_s$, and a size of the FFT, $N_{fft} > N_s$, the Final LUT has a number of samples $N^L_s$, then a number samples, $N^L_s$, and FFT size, $N^L_{fft}$, is needed such that $\Delta r^{pulse}_{bin\ size} = \Delta r^L_{bin\ size}$. This gives the condition that $N_s/N_{fft} = N^L_s/N^L_{fft}$. This is a search process for $N^L_s$ and $N^L_{fft}$, (With the constraint that B is fixed and $N^L_{fft}$ is a power of two), because $N^L_s$ can be more than two times greater or more than two times smaller than N.

This data is then time shifted (e.g., shifted in relative range within the pulse) based on the difference between the radar scheduled pulse nominal range and the particular chaff puck centroid trajectory (Remember the Final LUT had the chaff centered in the radar range window as if the radar knew exactly where to place the range window). The trajectory phase of the puck centroid is applied to the data at this point (Since each chaff piece has a phase reference to the chaff puck centroid in the LUT, this combined with the chaff puck centroid trajectory phase produces the appropriate trajectory phase for each chaff piece. Recall the pulse model (exp($i2\pi$ ($B\tau_{roff} n(N-1) + f_c \tau_{roff}$))) for each chaff piece in the Final LUT, this is multiplied by exp($i2\lambda f_c \tau_{rt}$). $\tau_{rt} = 2R(t)/c$, R(t) is the chaff puck slant range from the radar as a function of time. The time shifted pulse for each puck is then transformed to the time domain from the frequency domain, (In a process matching the radar's process for windowing and ordering of FFT and data shifts which are typically somewhat unique for each radar), and summed with the radar pulse under construction with appropriate scaling for losses. (atmospheric, beam shape etc.)

This process can be applied to produce monopulse data to provide high fidelity radar angle measurements. A full implementation for a phase comparison monopulse system would produce four Final LUT's for each of four phase center offsets (Assuming four is the appropriate number for the modeled radar) by doing the Final LUT generation process for each phase center, but with the radar reference location shifted for each to that particular monopulse channel phase center. Then the real time process is performed for each of the four monopulse channel phase center offsets and appropriate sum and difference channel data is produced for each radar pulse. An initial implementation includes the real time portion described herein, but not the four Final LUT's. The four Final LUT's for highest fidelity monopulse data is more closely tied to the trajectories that the data was created for. The approach is based on recognition that for each monopulse channel the outgoing EM wave's radar slant range, R, is considered to be the same for all channels, which is the equivalent of a single transmitter located at the mid point of the monopulse channel locations. Then for each channel the receive slant range is slightly different, $R+\delta R_q$. Then when the Acceleration Method range shift is computed for the $q^{th}$ channel, $2R+\delta R_q$ is used for computation of the time (range) shift of the chaff pulse and for the trajectory phase addition.

Figure 2:
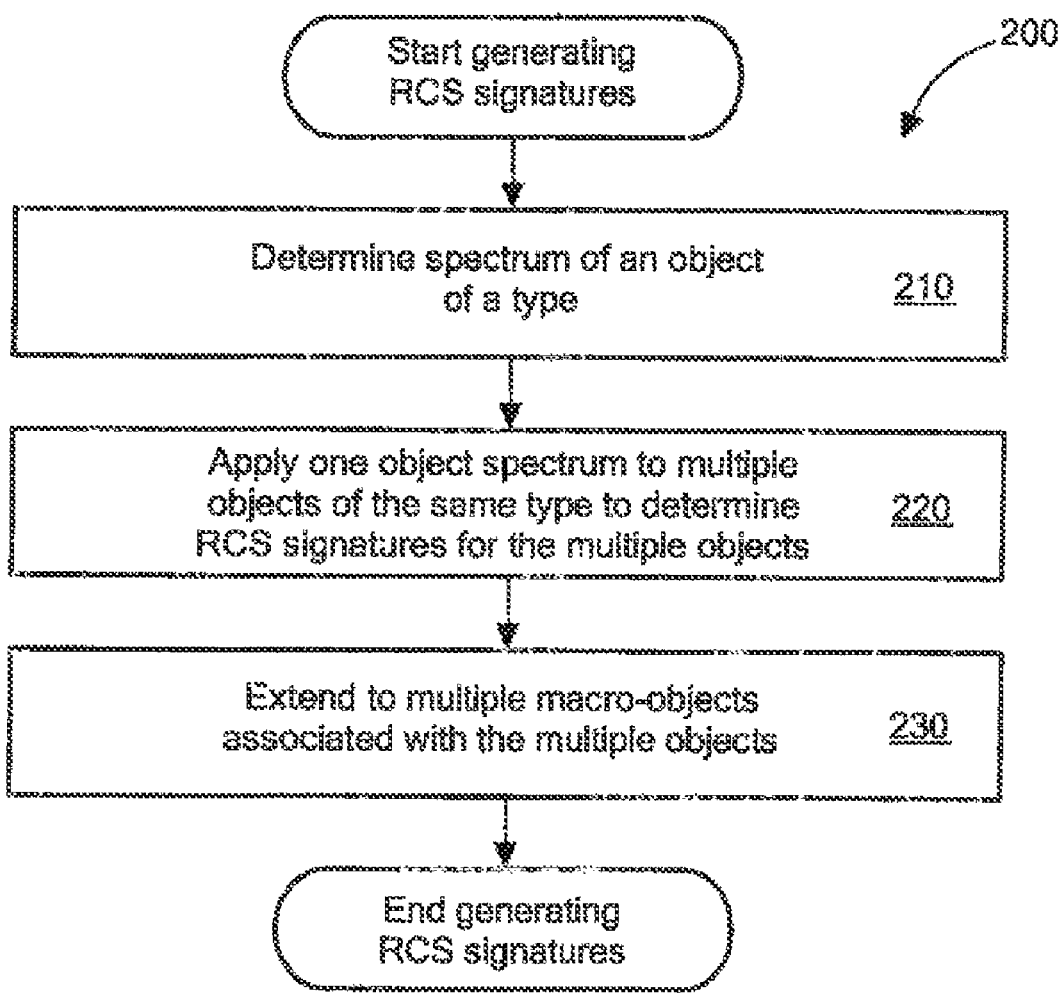
FIG. 2 is a flowchart of an example of a process to generate radar cross section (RCS) signatures.

Referring to FIG. 2, one example of determining RCS signatures of objects is a process 200. The approach for generating the Final LUT to be used in the real time processing is as follows. A sequence of radar pulses of the form of a deramped LFM waveform frequency spectrum is determined for an object (Chaff Puck) (210). This LFM is the equivalent of a radar LFM waveform that has the full operational bandwidth of the radar and operational center frequency of the radar. In the time domain the chaff cloud centroid is centered in the radar pulse range window. Centering here means the chaff cloud centroid trajectory is the radar range window center reference for each simulated pulse, the final sequence of simulated pulses is exactly the aligned and phase corrected data one would expect if the radar had placed a sequence of wideband LFM pulses on the chaff puck centroid and applied a trajectory phase correction based on the puck trajectory, but it is stored in the frequency domain.

The Final LUT is made up of radar pulses in the frequency domain. The $m^{th}$ radar pulse's $n^{th}$ frequency sample, aligned and phase corrected to target CG/chaff puck CG is given by:

$$s_f(n,m) = \tau_k S_k(m,n) \exp(i2\pi(B\tau(m)_{roff\_k} n/(N-1) + f_c \tau(m)_{roff\_k}))$$

Sum over k is sum over chaff pieces' (scatterers') radar slant range offset from chaff puck CG at $m^{th}$ time, n is pulse frequency sample index, $n = \{-N/2 \text{ to } N/2\}$. $S_k(m,n)$ is the $k^{th}$ chaff piece scattering amplitude and phase from the Scattering LUT for chaff piece orientation at $m^{th}$ time at $n^{th}$ frequency. A 6 degree of freedom trajectory (6-DOF, CG trajectory+rotational motion of piece) is flown for each chaff piece. The radar slant range offset of the chaff piece is computed from the chaff puck trajectory and the difference in radar slant range (Line of sight) between the chaff puck and each chaff piece is computed. ($\tau(m)_{roff\_}^k = 2\Delta R(t)/c$) This is the round trip time offset of an electro-magnetic wave along the radar slant range of the $k^{th}$ chaff piece from the chaff puck for time indexed by m. The spectrum is represented in a lookup table where the rows are indexed by time since beginning of chaff dispensing for the puck and the columns are indexed by radar operating frequency. For each chaff piece in the puck a trajectory and chaff piece orientation is maintained or computed as a function of time. At each pulse time, the Scattering LUT is referenced for the current orientation of the each chaff piece to get its scattering amplitude and phase. Then this amplitude and phase is used in combination with a LFM relative range and phase offset mathematical model above, ($s_f(n,m) = \Sigma_k S_k(m,n) \exp(i2\pi(B\tau(m)_{roff\_k} n/(N-1) + f_c \tau(m)_{roff\_k}))$) to locate the chaff piece response in the radar pulse's range window with the appropriate relative phase. All of the chaff piece's LFM radar pulse responses are summed under the assumption of linear superposition in this implementation. The PRF (Pulse Repetition Frequency) of the Final LUT should be high enough that the chaff cloud expansion rate is still within the unambiguous Doppler window if one expects to use Doppler processing. The radar pulse range window should be large enough to encompass the whole chaff cloud at the end of the data interval for true fidelity also. This one LUT is then useful for multiple Monte Carlo runs of the same baseline target complex trajectory and radar location. For example, threat object and chaff puck trajectory offsets can be varied around this baseline trajectory. This limitation of same baseline target complex trajectory and radar location may be relaxed somewhat also.

Using the spectrum of one object RCS, signatures of other objects of the same type may be determined (220). For example, if the spectrum is of one chaff puck, then the spectrum of one chaff puck may be applied to multiple chaff pucks. The process of applying to cover multiple objects of the same type is applied to macro-objects (230). For example, if the macro-object is a chaff dispenser that holds chaff pucks, then the RCS signatures of multiple chaff dispensers and their chaff may be determined.

Figure 3:
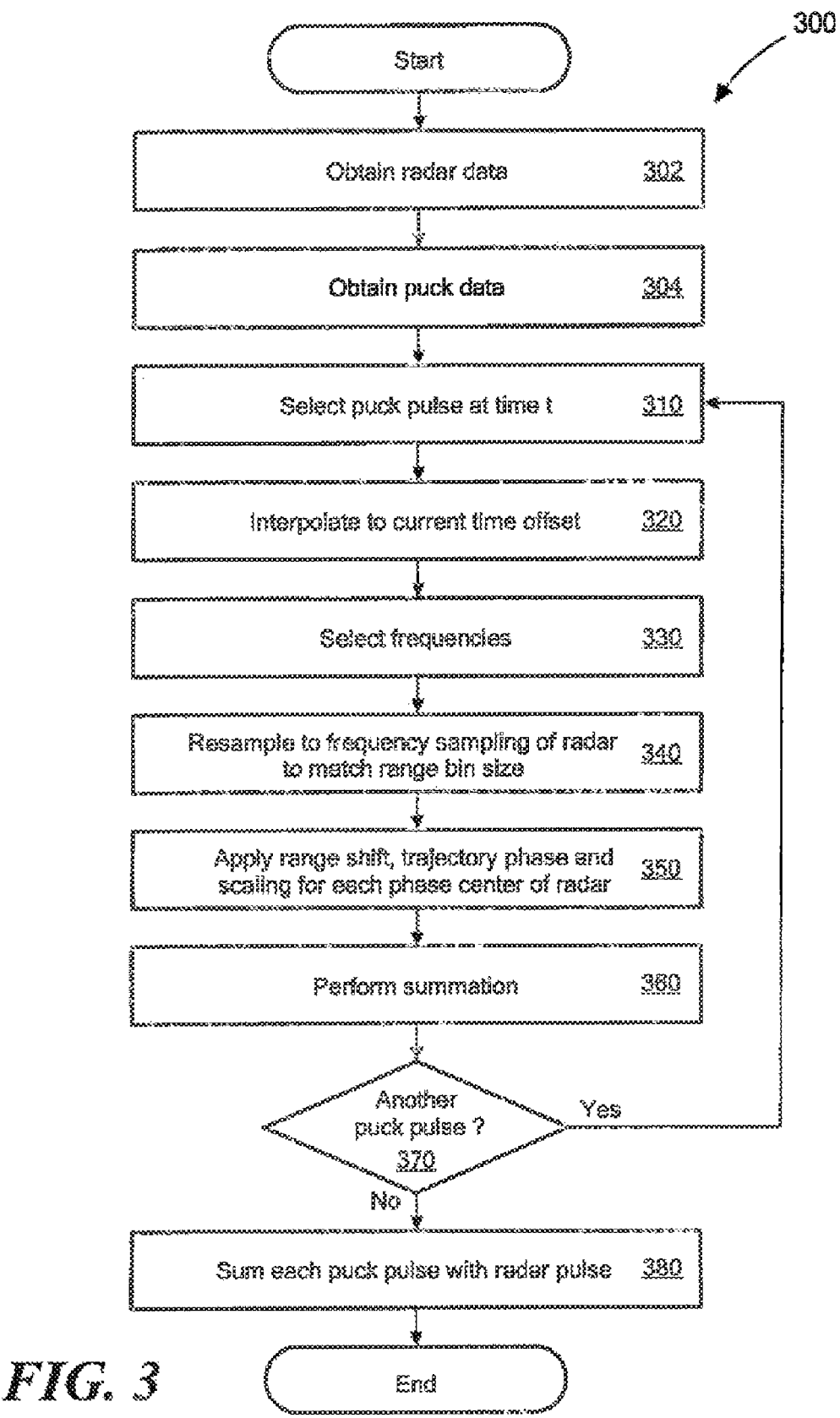
FIG. 3 is a flowchart of an example of a process to generate RCS signatures for multiple pucks of chaff.

Referring to FIG. 3, an example of a process to perform processing block 220 with respect to chaff, and in particular, determining RCS values for k pucks of chaff, is a process 300. A frequency response of a dipole (e.g., cylindrical) may be generated using low frequency RCS prediction tools (e.g., using method of moments, this is the Scattering LUT). The spectrum of one puck or dispenser may be generated from the Scattering LUT. This spectrum, a sequence of radar signature data pulses, is the Final LUT used in the real time process. This final LUT is accessed to generate radar pulses with multiple pucks inserted in real time thereby accelerating the high fidelity simulation capability timeline. Thus, simulating chaff signatures for multiple puck/dispenser activities may be achieved in real time by applying linear phase shifts, (e.g., according to scenario trajectories and radar beam scheduling), to pre-computed single puck radar signatures from the Final LUT and then coherently summing them with simulated real time radar pulses.

Radar data is obtained (302). For example for a time t, simulated I & Q radar pulse data for other targets within the radar beam is obtained; Radar beam placement data, R; U; V; Rd; Radar beam parameters, bandwidth, B; center frequency, $f_c$; pulse width, PW; scaling, $S_c$; and the pulse's range bin size, $\Delta r_{bin\ size}$.

Puck data is obtained (304). For example, for each puck a trajectory and dispense time information is obtained. For example, for a k-th puck, the initial puck dispense time for the k-th puck, $t_{0,k}$, is obtained and a slant range, $R_k$ is obtained. In one example, $k^{th}$ chaff puck trajectory is propagated to current radar pulse time. The slant range $R_k$, from the radar antenna center to the chaff puck is determined. The slant range, $R_p$, to the radar pulse's nominal reference point as placed by the radar pulse scheduler is obtained. Then the slant range offset $\Delta R_k = R_k - R_p$, of the chaff puck relative to the radar pulse reference is determined.

Figure 4:
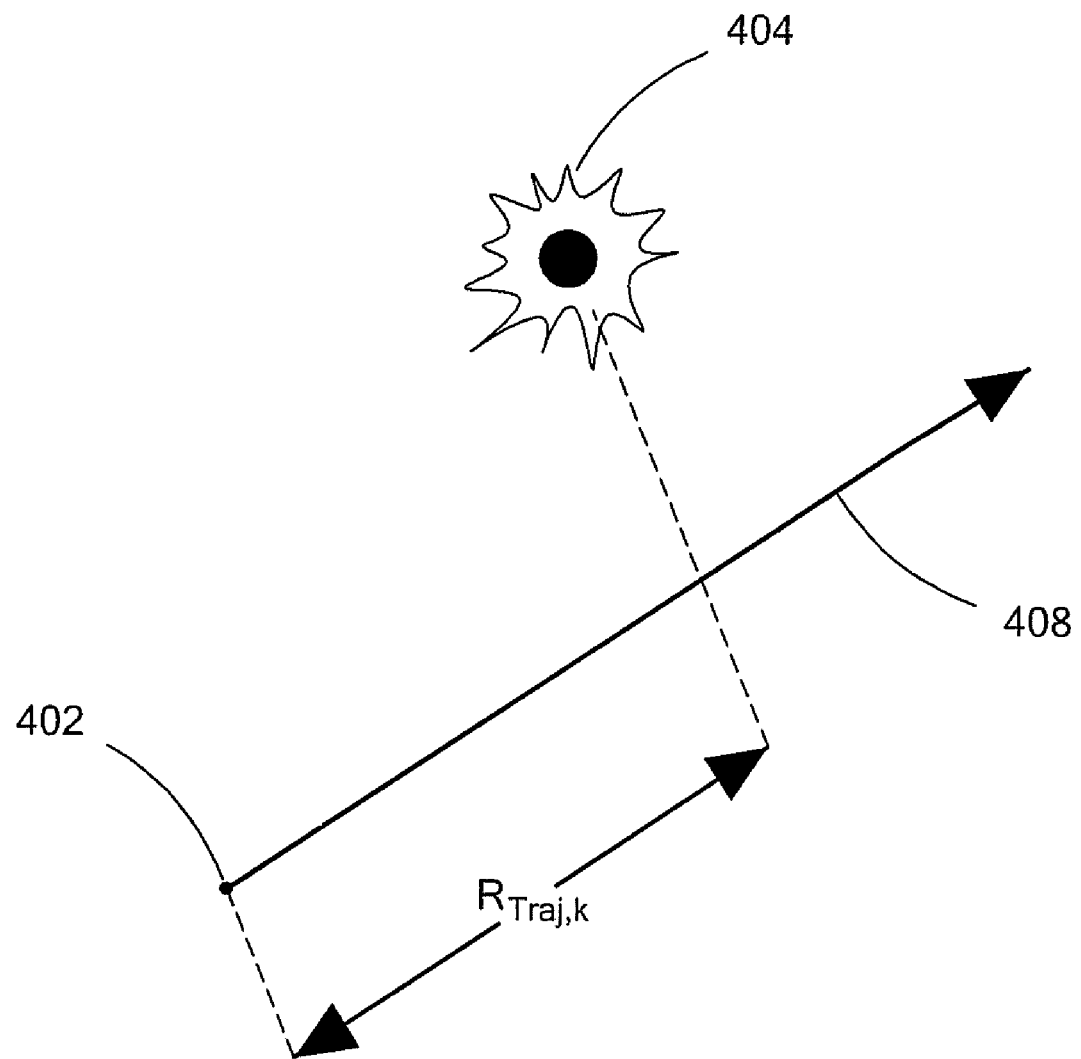
FIG. 4 is a diagram depicting range determination.

Referring to FIG. 4, in one example, $R_k$ is measured from an origin 402 of a radar (Antenna center) to the k-th puck 404 along a direction of the radar beam 408. A slant range difference, $\Delta R_k$, is the difference of the slant range, $R_k$, of the chaff puck and the reference range of a radar pulse beam 408.

Figure 5:
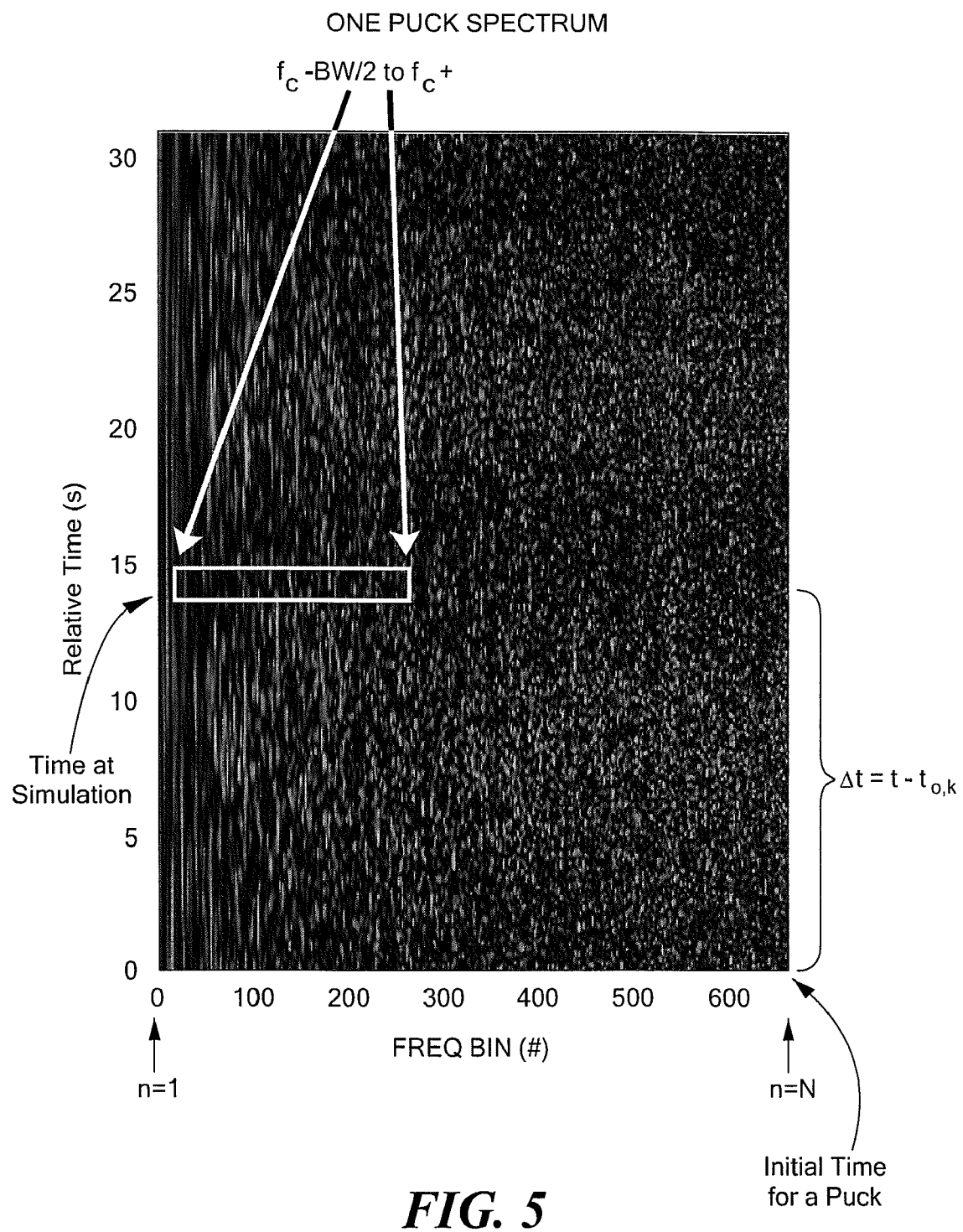
FIG. 5 is an example of spectrum of one puck of chaff.

Referring back to FIG. 3, for each puck, processing blocks 310-360 are performed. A puck pulse is selected for time, t (310). For example, a frequency domain simulated pulse is obtained from a look-up table, the Final LUT, representing a spectrum of a puck shown in FIG. 5. The frequency domain simulated pulse to be added into the radar pulse is interpolated to the current time offset of the radar pulse by using the Final LUT pulses from just before and just after the current pulse time (320). For example, an interpolated time, $\Delta t_k$, is equal to time, t, minus the dispense time of the k-th puck, $t_{0,k}$. The dispense time corresponds to the time the chaff is first dispensed from the puck.

The frequencies are selected (330). For example, frequency bins are selected to match the current radar pulse's center frequency, $f_c$, and bandwidth, B. For example, $f_c - B/2$ to $f_c + B/2$. A resampling is performed to frequency sampling of the radar to match range bin size, $\Delta r_{bin\ size}$ (340).

A range shift, trajectory phase and scaling for each radar phase center is applied (350). (Here the chaff puck data is shifted from the center of the pulse, as stored in the Final LUT, to the offset due to the radar's pulse placement, adding in the trajectory phase component of the chaff puck to the pulse from the Final LUT data and then scaling for beam shape, atmospheric and other losses and unit conversion from meters for chaff signal amplitude as stored in the Final LUT to the radar internal signal processing units.)

The radar pulse round trip time, $\tau_{rt} = (R_k + R_{mrtk})/c$ and object time offset from the radar pulse's reference time, $\tau_{roff} = (\Delta R_k + \Delta R_{mk})/c$. These are the outbound slant range from the radar antenna center, $R_k$, and the returning pulse slant range from the $m^{th}$ antenna phase center to the object $R_{mk}$. The radar LFM signal model is $\exp(i2\pi(B\tau_{roff} n/(N_s - 1) + f_c \tau_{rt}))$. For processing convenience the radar pulse's range bin size $\Delta r_{bin\ size}$ and $c = \lambda_c f_c$ are used to change the dependence of the radar LFM signal model from $\tau_{rt}$ and $\tau_{roff}$ to $\Delta R_{fmk}$ and $(R_k + R_{mrtk})$. For example the fractional portion and integer portion, $\Delta R_{fmk}$ and $\Delta R_{ik}$, of $(\Delta R_k + \Delta R_{mk})/2$ modulo $\Delta r_{bin\ size}$ are computed where $|\Delta R_{fmk}| < \Delta r_{bin\ size}$ and $\Delta R_{ik} = M \Delta r_{bin}$ size, $\Delta r_{bin\ size}$ is a range bin size for the radar waveform and M is an integer such that $(\Delta R_k + \Delta R_{mk})/2 = \Delta R_{fmk} + \Delta R_{i,k}$. This split into fractional and integer portions is done so that the data is not wrapped around in the time domain after applying the Discreet Fourier Transform. The fractional component is required for narrow bandwidth pulses which can have range bin sizes of greater than 20 meters. It is at this point that the appropriate RDC adjustments are made, if necessary, based on the radar's handling of it. One should compute one value of $\Delta R_{ik}$ to be used for all four phase centers since the integer shift is most efficiently applied after the phase center data is combined and transformed to the time domain. The equation for the fractionally shifted puck data is then; $S_c w_n S'_n \exp(i2\pi \Delta R_{fmk}/\Delta r_{bin\ size}\ n/(N_s - 1) + i2\pi (R_k + R_{mrtk})\lambda_c)$, with $S'_n$ the $n^{th}$ frequency sample of the resampled (frequency) and interpolated (time) Final LUT data selected for the $k^{th}$ puck and the current pulse. $S_c$ is the scaling for losses and unit conversion and $w_n$ the window, applied in preparation for Fourier transformation, for sidelobe reduction in the time domain. $2\lambda(R_k + R_{mrtk})/\lambda_c$ is the trajectory phase term for the chaff puck.

A summation is performed (360). For example, sums and differences are performed to form $\Sigma$, $\Delta_\alpha$, $\Delta_\beta$ data, this is the sum signal and monopulse information, so angular information can be measured on targets.

In this implementation these sums and differences are done in the frequency domain prior to Fourier transformation to reduce processing load. Then, for the current puck's data, they're transformed to the time domain, and the integer shift is applied according to $\Delta R_{ik}/\Delta r_{bin\ size}$. This shifted time domain puck data is added to the radar pulse.

It is determined if another puck is available (370). If another puck is available, processing blocks 310 to 370 are performed again.

Referring to FIGS. 6A to 6C, show sequences of radar pulses in the time domain. FIG. 6A shows aligned chaff cloud data as stored in the Final LUT. FIG. 6B shows the chaff cloud data shifted based on a radar's reference pulse alignment as done in the Real Time Process. FIG. 6C shows the chaff cloud with wrapping at the end of the data if the shift done in the Real Time Process were not broken into integer and fractional parts.

The following pseudo code may be used to determine RCS for chaff. References in the pseudo code are made to process 300.

---

Algorithm Pseudo Code
    Offline
        Construct
            Scattering LUT
            Final LUT
    Real Time/Near Real Time Portion (Example implementation of algorithm)
        While Radar Makes Pulse Requests (302)
            For each chaff puck (Index k)
                Propagate $k^{th}$ chaff puck trajectory to pulse time (304)
                Compute $R_k$, the slant range from the radar antenna center to the chaff puck
                Compute $\Delta R_k = R_k - R_p$, $R_p$ is the slant range to the pulse's nominal reference point as placed by the radar pulse scheduler.
                Interpolate to pulse time and frequency bins from Final LUT, $S'_n$ (310, 320, 330, 340)
                    (Frequency Index n)
                    (Could be $M_{phase-center}$ of Final LUT's and $S'_{mn}$'s if highest fidelity desired) (End 310, 320, 330, 340)
            $Z^k_{mn}$ is $m^{th}$ phase center frequency domain chaff puck radar pulse data
            For each radar antenna phase center (Index m) (350)
                Compute $\Delta R_{mk}$ and $R_{mrtk}$, k is index of current puck, $R_{mrtk}$ is the slant range from the $m^{th}$ phase center to the chaff puck, and $\Delta R_{mk} = R_{mrtk} - R_p$
                Compute $\Delta R_{mfk}$ and $\Delta R_{ik}$,
                    The fractional portion and integer portion of $(\Delta R_k + \Delta R_{mk})/2$ modulo $\Delta r_{bin\ size}$
                    $\tau_{rt} = (R_k + R_{mrtk})/c$ and
                    $\tau_{roff} = (\Delta R_k + \Delta R_{mk})/c$, $\Delta r_{bin\ size} = c/(2B)$ $(N_s - 1)/(N_s - 1)$
                    One should compute one value of $\Delta R_{ik}$ to be used for all four phase centers since the integer shift is most efficiently applied after the phase center data is combined.
                    $z^k_{mn} = S_c S'_n \exp(i2\pi \Delta R_{mfk}/\Delta r_{bin\ size}\ n/(N_s - 1) + i2\pi(R_k + R_{mrtk})/\lambda)$
                    $n = \{-N_s/2$ to $N_s/2\}$ to minimize additional phase variation that can bias Doppler processing results
                    $S_c$ is scaling for beam shape, atmospheric and other losses and scaling. $(i = \sqrt{-1})$
            End for each radar phase center (End 350)
            Frequency domain fractional shift pulse data (360)
            $f\Delta^k_{\alpha n} = z^k_{1n} + z^k_{2n} - z^k_{3n} - z^k_{4n}$, Alpha channel for $k^{th}$ puck
            $f\Delta^k_{\beta n} = z^k_{1n} + z^k_{3n} - z^k_{2n} - z^k_{4n}$, Beta channel for $k^{th}$ puck
            $f\pi^k_n = z^k_{1n} + z^k_{2n} + z^k_{3n} + z^k_{4n}$, Sum channel for $k^{th}$ puck, (End 360)
            Transform $f\Delta^k_{\alpha n}$, $f\Delta^k_{\beta n}$, $f\pi^k$ to time domain
            $\Delta^k_{\alpha t} = \text{transform}(f\Delta^k_{\alpha n})$
            $\Delta^k_{\beta t} = \text{transform}(f\Delta^k_{\alpha n})$
            $\pi^k_t = \text{transform}(f\pi^k_n)$
            Perform integer shift corresponding to $\Delta R_{ik}/\Delta r_{bin\ size}$
            $\Delta^k_{\alpha s}$ = integer shift of $\Delta^k_{\alpha t}$
            $\Delta^k_{\beta s}$ = integer shift of $\Delta^k_{\beta t}$
            $\pi^k_s$ = integer shift of $\pi^k_t$
            Sum with current radar pulse under construction (380)
            $Z_{\Delta\alpha} = Z_{\Delta\alpha} + \Delta^k_{\alpha s}$
            $Z_{\Delta\beta} = Z_{\Delta\beta} + \Delta^k_{\beta s}$
            $Z_\pi = Z_\pi + \pi^k_s$ (End 380)
        End for each chaff puck
        Pulse data is now constructed and ready for detection processing
        $\pi$ = Sum of m phase centers' $Z_\pi$ is sum channel pulse
        $\Delta_\alpha$ = Appropriate sum and difference of m phase centers' $Z_{\Delta\alpha}$ is alpha difference channel pulse
        $\Delta_\beta$ = Appropriate sum and difference of m phase centers' $Z_{\Delta\beta}$ is beta difference channel pulse
End While Radar Makes Pulse Requests (End 302)

---

Figure 7:
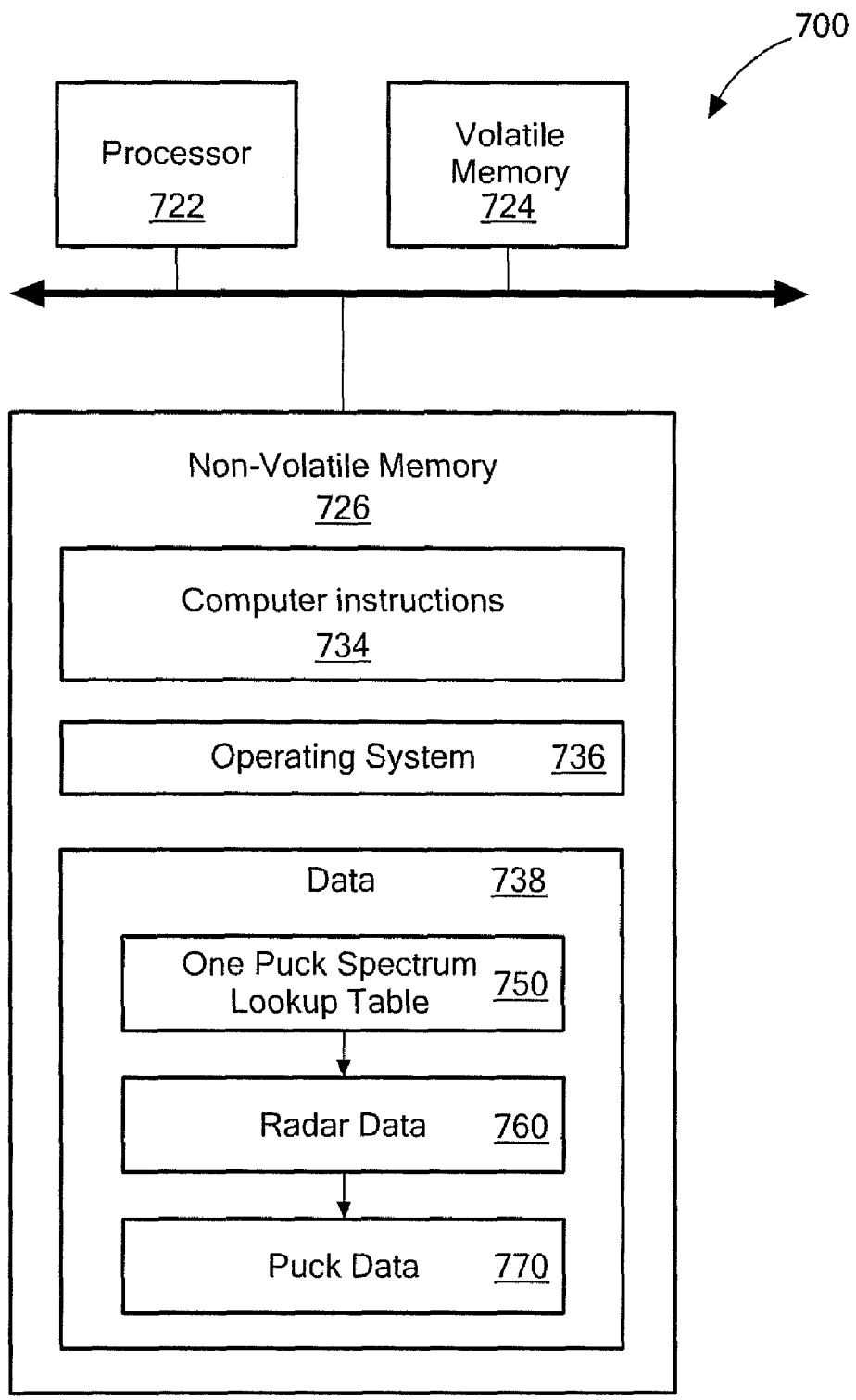
FIG. 7 is a block diagram of an example of a computer on which the process of FIG. 4 may be implemented.

Referring to FIG. 7, a computer 700 includes a processor 722 and a volatile memory 724, a non-volatile memory 726 (e.g., a hard disk). The non-volatile memory 726 stores computer instructions 734, an operating system 736 and data 738 including a one puck spectrum lookup table 750 (e.g., Final Look-Up Table), radar data 760 and puck data 770. In one example, the radar data includes I & Q, time, R, U, V, B, $f_c$, PW Scaling, and bin size. In one example, the puck data 770 includes puck dispense time and puck trajectory. In one example, the computer instructions 734 are executed by the processor 722 out of volatile memory 724 to perform all or part of the process 300.

Process 300 is not limited to use with the hardware and software of FIG. 7; they may find applicability in any computing or processing environment and with any type of machine or set of machines that is capable of running a computer program. Process 300 may be implemented in hardware, software, or a combination of the two. Process 300 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform process 300 and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform process 300. Process 300 may also be implemented as a machine-readable storage medium, configured with a computer program, where upon execution, instructions in the computer program cause the computer to operate in accordance with process 300.

The processes described herein are not limited to the specific embodiments described. For example, the process 300 is not limited to the specific processing order of FIG. 3. Rather, any of the processing blocks of FIG. 3 may be re-ordered, combined or removed, performed in parallel or in serial, as necessary, to achieve the results set forth above.

The processing blocks in FIG. 3 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method to generate radar cross section (RCS) signatures, comprising:
   determining a spectrum of a first object using a computer; and
   using the spectrum of the first object to generate RCS signatures of a plurality of objects, using the computer, by applying the spectrum of the first object to each of the plurality of objects, using the spectrum of the first object comprising:
   interpolating time;
   selecting frequencies to match a center frequency and bandwidth of a radar pulse;
   resampling to frequency sampling of radar to match a range bin size; and
   shifting and applying trajectory phase and scaling.

2. The method of claim 1 wherein using the spectrum of the first object to generate RCS signatures of a plurality of objects comprises using a lookup table representing the spectrum of the first object.

3. The method of claim 1 wherein determining a spectrum of the first object comprises determining a frequency spectrum of the first object.

4. The method of claim 1 wherein determining a spectrum of the first object comprises determining a spectrum of an object comprising chaff.

5. The method of claim 4 wherein using the spectrum of the first object to generate RCS signatures of a plurality of objects comprises using the spectrum of the first object comprising chaff to generate RCS signatures of a plurality of objects comprising chaff.

6. The method of claim 1, further comprising:
   determining a spectrum of a first macro-object object using the computer; and
   using the spectrum of the first macro-object to generate RCS signatures of a plurality of macro-objects, using the computer, by applying the spectrum of the first macro-object to each of the plurality of macro-objects,
   wherein using the spectrum of the first macro-object to generate RCS signatures of a plurality of macro-objects comprises:
   interpolating time;
   selecting frequencies to match a center frequency and bandwidth of a radar pulse;
   resampling to frequency sampling of radar to match a range bin size; and
   shifting and applying trajectory phase and scaling.

7. The method of claim 6 wherein determining the spectrum of first object comprises determining a spectrum of a chaff puck, and
   wherein determining the spectrum of a first macro-object comprises determining a spectrum of a chaff dispenser.

8. An apparatus to generate radar cross section (RCS) signatures, comprising:
   circuitry configured to:
   determine a spectrum of a first object; and
   use the spectrum of the first object to generate RCS signatures of a plurality of objects, by applying the spectrum of the first object to each of the plurality of objects,
   wherein the circuitry configured to use the spectrum of the first object comprises circuitry configured to:
   interpolate time;
   select frequencies to match a center frequency and bandwidth of a radar pulse;
   resample to frequency sampling of radar to match a range bin size; and
   shift and apply trajectory phase and scaling.

9. The apparatus of claim 8 wherein the circuitry comprises at least one of a processor, a memory, programmable logic and logic gates.

10. The apparatus of claim 8 wherein the circuitry to use the spectrum of the first object to generate RCS signatures of a plurality of objects comprises circuitry to use a lookup table representing the spectrum of the first object.

11. The apparatus of claim 8 wherein the circuitry to determine a spectrum of the first object comprises circuitry to determine a frequency spectrum of the first object.

12. The apparatus of claim 8 wherein the circuitry to determine a spectrum of the first object comprises circuitry to determine a spectrum of an object comprising chaff.

13. The apparatus of claim 12 wherein the circuitry to use the spectrum of the first object to generate RCS signatures of a plurality of objects comprises circuitry to use the spectrum of the first object comprising chaff to generate RCS signatures of a plurality of objects comprising chaff.

14. The apparatus of claim 8 wherein the circuitry is further configured to:
   determine a spectrum of a first macro-object object using the circuitry; and
   use the spectrum of the first macro-object to generate RCS signatures of a plurality of macro-objects, using the circuitry, by applying the spectrum of the first macro-object to each of the plurality of macro-objects,
   wherein the circuitry configured to use the spectrum of the first macro-object to generate RCS signatures of a plurality of macro-objects comprises circuitry configured to:
   interpolate time;
   select frequencies to match a center frequency and bandwidth of a radar pulse;
   resample to frequency sampling of radar to match a range bin size; and
   shift and apply trajectory phase and scaling,
   wherein the circuitry configured to determine the spectrum of first object comprises circuitry configured to determine a spectrum of a chaff puck, and
   wherein the circuitry configured to determine the spectrum of a first macro-object comprises circuitry configured to determine a spectrum of a chaff dispenser.

15. An article, comprising:
   a non-transitory machine-readable medium that stores executable instructions to generate radar cross section signatures (RCS), the executable instructions causing a machine to:
   determine a spectrum of an object; and
   use the spectrum of the object to generate RCS signatures of a plurality of objects, by applying the spectrum of the first object to each of the plurality of objects,
   wherein the instructions causing the machine to use the spectrum of the first object comprises instructions causing the machine to:
   interpolate time;
   elect frequencies to match a center frequency and bandwidth of a radar pulse;
   resample to frequency sampling of radar to match a range bin size; and
   shift and apply trajectory phase and scaling.

16. The article of claim 15 wherein the instructions causing the machine to use the spectrum of the first object to generate RCS signatures of a plurality of objects comprises instructions causing the machine to use a lookup table representing the spectrum of the first object.

17. The article of claim 15 wherein the instructions causing the machine to determine a spectrum of the first object comprises instructions causing the machine to determine a frequency spectrum of the first object.

18. The article of claim 15 wherein the instructions causing the machine to determine a spectrum of the first object comprises instructions causing the machine to determine a spectrum of an object comprising chaff.

19. The article of claim 18 wherein the instructions causing the machine to use the spectrum of the first object to generate RCS signatures of a plurality of objects comprises instructions causing the machine to use the spectrum of the first object comprising chaff to generate RCS signatures of a plurality of objects comprising chaff.

20. The article of claim 15 further comprising instructions causing the machine to:
   determine a spectrum of a first macro-object object using the machine; and
   use the spectrum of the first macro-object to generate RCS signatures of a plurality of macro-objects, using the machine, by applying the spectrum of the first macro-object to each of the plurality of macro-objects,
wherein the instructions causing the machine to use the spectrum of the first macro-object to generate RCS signatures of a plurality of macro-objects comprises instructions causing the machine to:
   interpolate time;
   select frequencies to match a center frequency and bandwidth of a radar pulse;
   resample to frequency sampling of radar to match a range bin size; and
   shift and apply trajectory phase and scaling,
wherein the instructions causing the machine to determine the spectrum of first object comprises instructions causing the machine to determine a spectrum of a chaff puck, and
wherein the instructions causing the machine to determine the spectrum of a first macro-object comprises instructions causing the machine to determine a spectrum of a chaff dispenser.

* * * * *